United States Patent [19]

Martinez-Corral et al.

[11] Patent Number: 4,667,794
[45] Date of Patent: * May 26, 1987

[54] CLUTCH COVER ASSEMBLY AND PRESSURE PLATE FOR SAME

[75] Inventors: Cécilio Martinez-Corral; Pedro Lacal-Ruiz, both of Madrid, Spain

[73] Assignee: Valeo, Paris, France

[*] Notice: The portion of the term of this patent subsequent to Jul. 16, 2002 has been disclaimed.

[21] Appl. No.: 613,190

[22] Filed: May 23, 1984

[30] Foreign Application Priority Data

May 24, 1983 [FR] France .............................. 83 08523

[51] Int. Cl.4 ............................................. F16D 13/72
[52] U.S. Cl. ............................. 192/70.12; 192/113 A
[58] Field of Search ........................ 192/70.12, 113 A

[56] References Cited

U.S. PATENT DOCUMENTS

| 2,107,954 | 2/1938 | Morton et al. | 192/113 R |
| 2,205,929 | 6/1940 | Peterson | 192/70.12 |
| 2,554,874 | 5/1951 | Oetzel | 192/113 A X |
| 2,770,341 | 11/1956 | Wobrock | 192/70.12 |
| 2,885,047 | 5/1959 | Kehrl | 192/70.12 |
| 3,712,435 | 1/1973 | Kraus | 192/113 A X |
| 4,114,741 | 9/1978 | Lindquist | 192/113 A X |
| 4,529,074 | 7/1985 | Alas | 192/70.12 |

FOREIGN PATENT DOCUMENTS

| 1208220 | 2/1960 | France | 192/113 A |
| 1250355 | 10/1971 | United Kingdom | 192/70.12 |
| 2094420 | 9/1982 | United Kingdom . | |

Primary Examiner—Leonard E. Smith
Attorney, Agent, or Firm—Charles E. Brown; Charles A. Brown

[57] ABSTRACT

A clutch cover assembly suitable for automotive vehicles comprises a flange featuring vanes and holes whereby ventilation of the axial volume of the assembly is improved. In one version this flange is part of a confinement member associated with cooling fins on the pressure plate of the clutch cover assembly to define passages for the circulation of cooling air. In another version the flange is part of a bearing member disposed between the pressure plate and a diaphragm spring of the clutch cover assembly.

14 Claims, 4 Drawing Figures

CLUTCH COVER ASSEMBLY AND PRESSURE PLATE FOR SAME

BACKGROUND OF THE INVENTION

1. Field of the Invention

The present invention is generally concerned with clutch cover assemblies, that is to say the assembly of parts which, in order to make up a clutch, in particular for an automotive vehicle, is fastened as a unit to a reaction plate or flywheel with a friction disk disposed between them.

2. Description of the Prior Art

As is known, a clutch cover assembly generally comprises a first generally annular member called the cover through which it is adapted to be attached to the associated reaction plate, a second generally annular member called the pressure plate which is constrained to rotate with said cover whilst being mounted so as to be movable axially relative to the latter, and which is adapted to clamp the friction disk axially against the reaction plate, and elastic means which, for the purposes of this clamping or engagement, urge said pressure plate in the direction towards said reaction plate, said elastic means bearing for this purpose on the cover so as to exert a force in the axial direction on the pressure plate.

Elastic means of this kind may, for example, form part of a third generally annular member called the diaphragm spring which is inserted axially between the pressure plate and the cover and comprises, on the one hand, a circumferentially continuous peripheral part forming a Belleville washer and constituting said elastic means and, on the other hand, a central part divided into radial fingers by slots, said central part forming levers by means of which the assembly may be operated to disengage it.

Generally speaking, a diaphragm spring of this kind usually bears directly on the pressure plate having for this purpose an annular bead projecting in the axial direction, possibly subdivided circumferentially into separate bosses.

Be this as it may, in service the internal volume of a clutch cover assembly of this kind is inevitably subjected to an increase in temperature, in particular due to friction forces which are developed between the friction disk on the one hand and, on the other hand, the pressure and reaction plates, each time the clutch is disengaged and each time it is engaged.

In U.S. patent application Ser. No. 601,251 filed Apr. 17, 1984 and now U.S. Pat. No. 4,529,074 there is described a clutch cover assembly pressure plate, suitable for automotive vehicles, of the kind comprising axially projecting cooling fins on the side opposite that which is adapted to operate on a friction disk and certain at least of which are relatively longer cooling fins which extend substantially from its inside perimeter to its outside perimeter, and delimit between them air circulation grooves which are oblique to a radial plane passing through their median area, a distinct and separate confinement member adapted to close off said air circulation grooves in the axial direction over at least part of their length and on the side opposite the pressure plate and fixing means whereby said confinement member is rigidly attached to said pressure plate.

A confinement member of this kind advantageously defines with the air circulation grooves true channels within which, by virtue of the resulting confinement, the circulation of air is forced, that is to say accelerated, which is of positive benefit with regard to the required ventilation.

The cooling fins take up warm air at the inside perimeter of the pressure plate, within the axial volume of the assembly, and direct it to the outside perimeter of the pressure plate, by means of the air circulation channels delimited between them and the confinement member, and so evacuate it.

This arrangement calls for two remarks: firstly it may be desirable to eliminate the cooling fins; secondly, and whatever else might apply, it may also be desirable to further improve the cooling effect.

SUMMARY OF THE INVENTION

In one aspect the present invention consists in a clutch cover assembly comprising a generally annular cover adapted to be attached to a reaction plate, a generally annular pressure plate having an outside surface adapted to act on a friction disk, constrained to rotate with said cover and movable relative to said cover in an axial direction, elastic means which bear on said cover and exert an axial force on said pressure plate, and a bearing member adapted to generate a turbine effect within the axial volume of the assembly comprising a flange formed with holes and carrying vanes adapted to bear on said elastic means and on said pressure plate.

In a second aspect, the present invention consists in a clutch cover assembly comprising a generally annular cover adapted to be attached to a reaction plate, a generally annular pressure plate having an outside surface adapted to act on a friction disk and on an inside surface axially projecting cooling fins certain of which at least extend substantially from its inside perimeter to its outside perimeter and which delimit between them air circulation grooves, said pressure plate being constrained to rotate with said cover and movable relative to said cover in an axial direction, elastic means which bear on said cover and exert an axial force on said pressure plate, and a confinement member attached to said pressure plate and adapted to close off said air circulation grooves on the side opposite said pressure plate and over at least part of their length and further adapted to generate a turbine effect, comprising for this purpose a flange formed with holes and carrying vanes.

Those skilled in the art will note that using this arrangement the overall axial dimension of the assembly is hardly affected.

Said vanes may constitute local deformations of said flange.

The thus shaped flange may be obtained by stamping a blank. It will be noted that, with advantage, there is little loss of material as compared with the manufacture of the confinement member as described in the aforementioned patent application.

The flange may, in part, be fixed to a hub adapted to accommodate the clutch release bearing of the clutch cover assembly.

In a third aspect, the present invention consists in a clutch cover assembly pressure plate adapted on one side to act on a friction disk and comprising on its other side axially projecting cooling fins certain of which at least extend substantially from its inside perimeter to its outside perimeter and which delimit between them air circulation grooves, further comprising a confinement member attached to said pressure plate and adapted to close off said air circulation grooves on the side opposite said pressure plate and over at least part of their length and further adapted to generate a turbine effect, comprising for this purpose a flange formed with holes and carrying vanes.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
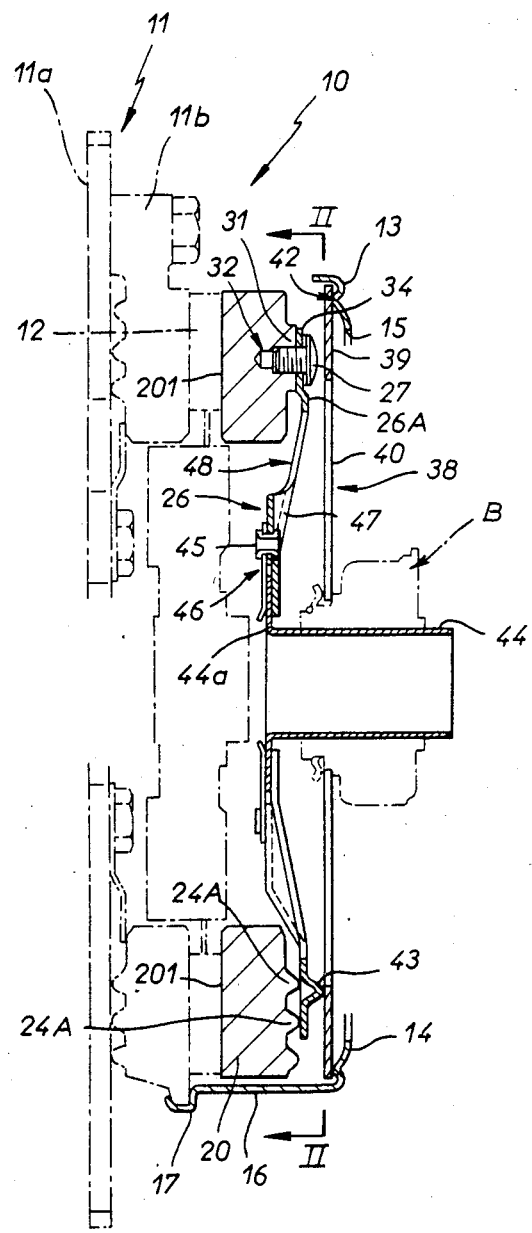
FIG. 1 is a view in axial cross-section on the line I—I in FIG. 2 of a clutch cover assembly equipped with a pressure plate in accordance with the invention.
Figure 2:
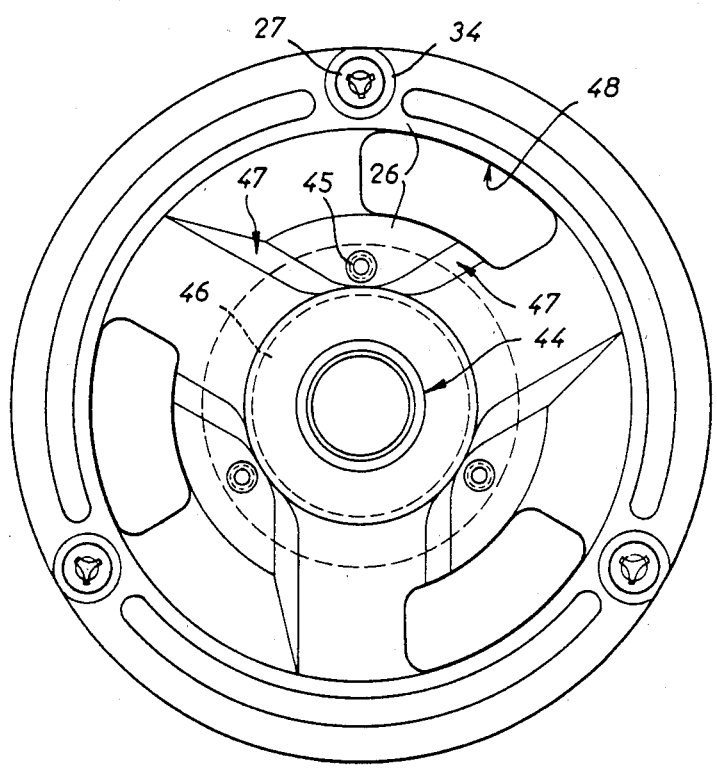
FIG. 2 is a partially cut-away view of it in transverse cross-section on the line II—II in FIG. 1.
Figure 3:
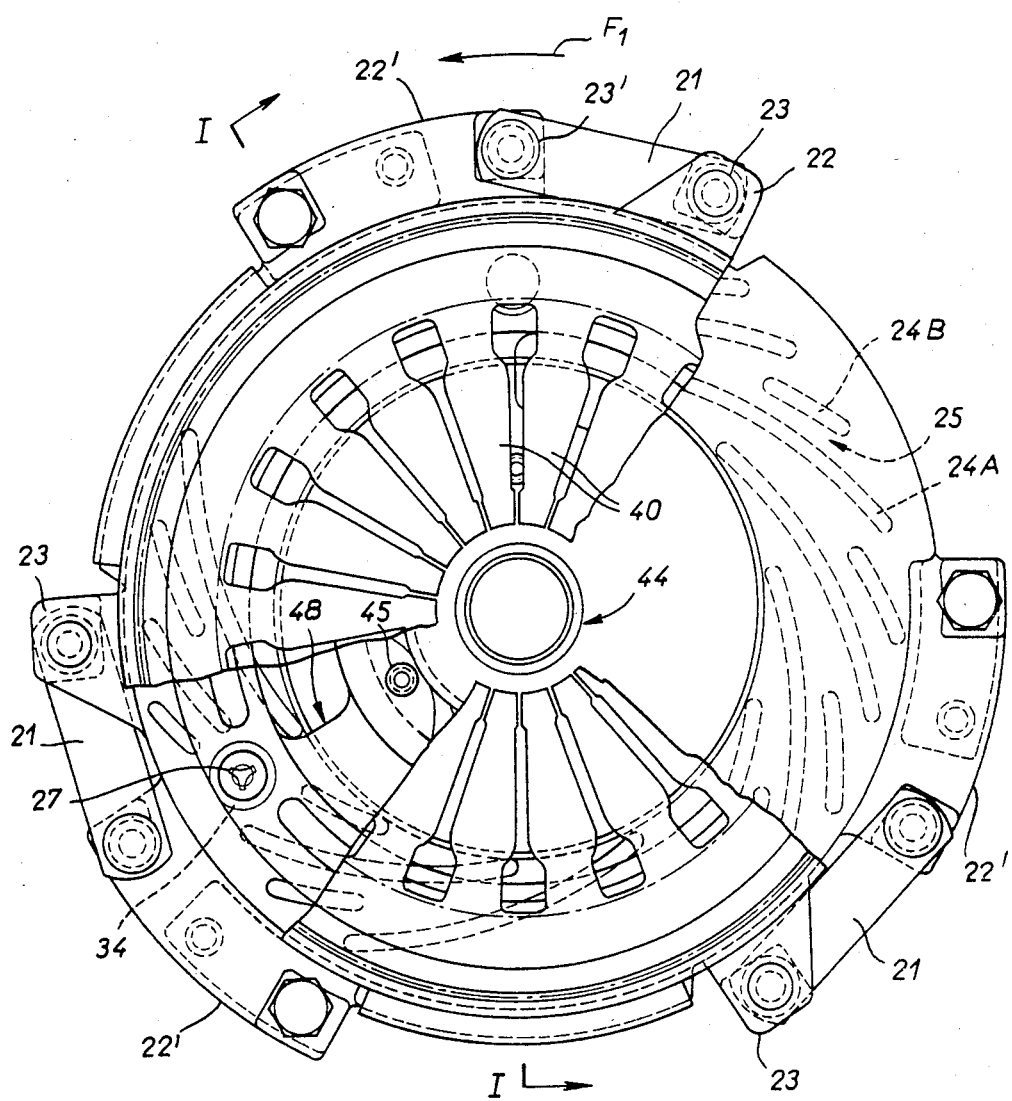
FIG. 3 is a front view of the clutch cover assembly equipped with a pressure plate in accordance with the invention.

As shown in FIG. 1, the clutch cover assembly 10 in accordance with the invention is designed to be attached to a reaction palte 11 consisting in this instance of an assembly fastened to the flywheel of the motor and comprising a first part 11a and a second part 11b hereinafter called the reaction plate proper, with a friction disk 12 inserted between the clutch cover assembly and this assembly. The reaction plate 11 and the friction disk 12 are shown in chain-dotted outline in FIG. 1.

In a manner known per se, the clutch cover assembly 10 in accordance with the invention comprises a first generally annular member 13 called the cover through which it is adapted to be attached to the reaction plate 11.

The cover 13 comprises a bottom 14 in which is a central opening 15, a lateral wall 16 which extends in a generally axial direction and, at the end of the latter, a crimped portion 17 which in this instance fixes it to the reaction plate proper 11b.

The central opening 15 in the cover 13 defines its inside peripheral contour.

For clamping the friction disk 12, the clutch cover assembly 10 comprises a second generally annular member 20 which is constrained to rotate with the cover 13 whilst being movable axially relative to the latter.

In a manner known per se, the pressure plate comprises an outside surface 201 through which it is adapted to act on the friction disk 12.

In the embodiment shown, and as schematically inidcated in the figure, the pressure plate 20 is, in a manner known per se, attached to the cover 13 by elastically deformable tangs 21 which extend substantially tangentially to a circumference of the assembly.

For example, three sets of such tangs 21 are provided, regularly distributed circumferentially in pairs at 120°, each comprising two superimposed tangs 21.

Each of these sets of tangs 21 extends between, on the one hand, a lug 22 on the pressure plate 20 which projects radially for this purpose at the outside perimeter of the latter, to which it is fastened by a rivet 23 and, on the other hand, a lug 22' on the reaction plate proper 11b to which it is attached by a rivet 23'.

In a manner known per se, the pressure plate 20 comprises, on its side opposite that through which it is adapted to act on the friction disk 12, axially projecting cooling fins 24A, 24B of which certain at least, namely the fins 24A referred to hereinafter for convenience as the long cooling fins, extend substantially from its inside perimeter to its outside perimeter, or at least to the vicinity of the latter, and delimit between them air circulation grooves 25 which are oblique to a radial plane passing through their median area.

In other words, the long cooling fins 24A extend obliquely from the outside perimeter of the pressure plate 20 to its inside perimeter, there being a circumferential offset between their end on said outside perimeter and their end on said inside perimeter, whereas the cooling fins 24b, which are shorter and are therefore referred to hereinafter for convenience as the short cooling fins, extend obliquely in a similar manner, the arrangement to be described in more detail subsequently.

Over at least part of their length, the air circulation grooves 25 are closed off in the axial direction, on the side opposite the pressure plate 20, by a member 26 referred to hereinafter for convenience as the confinement member, which is rigidly attached to said pressure plate 20.

In the embodiment shown, the confinement member 26 constitutes a distinct and separate part from the pressure plate 20 and is attached to the latter from place to place by means of appropriate fixing means. These fixing means may comprise screws 27, disposed axially.

The pressure plate 20 comprises bosses 31 of circular contour which project slightly in the axial direction, for fitting the corresponding fixing means. Each is formed with a hole adapted to receive said fixing means. This therefore consists of a blind threaded hole 32.

For preference, and as shown here, the bosses 31 which the pressure plate 20 thus features for fitting the fixing means for attaching to it the confinement member 26 occupy a substantially central position on the pressure plate 20, that is to say a position which is substantially half-way between its inside and outside perimeters.

Through its radially outermost peripheral part at least, which is generally plane and extends transvesely relative to the axis of the assembly, it touches the underlying cooling fins 24A, 24B, being immediately in the vicinity of the crest of the latter, as shown, or even in contact with this crest.

However, to provide for the fitting of the fixing means which attach it to the pressure plate 20 it features spaced bosses 34 which are set back in the axial direction relative to the main part of its radially outermost peripheral part.

The numer of these bosses 34 is the same as the number of the bosses 31 on the pressure plate 20, and each features a hole 36 for the corresponding fixing means to pass through. At each of these bosses 34, the confinement member 26 is held in contact with the corresponding boss 31 of said pressure plate 20 by one of these fixing means.

In the embodiment shown, the confinement member 26 extends radially over only part of the pressure plate 20, namely a circular peripheral part 26A, the confinement member being in form of a flange as will be explained hereinafter.

As a result, the air circulation grooves 25 are closed off in the axial direction over part only of their length by the peripheral part 26A of the confinement member 26.

However, as an alternative to this and if required, they may be totally closed off in the axial direction by the peripheral part 26A of the confinement member 26 over their full length.

The confinement member 26 of which the circular peripheral part 26A forms part advantageously consists of a circular flange extending from this peripheral part to a central hub 44 to which it is fixed by a set of rivets 45 and an annular disk assembly 46. A flange 44a on the central hub 44 is clamped between the flange part of the member 26 and said annular disk assembly 46, the rivets 45 passing through the flange and the annular disk assembly.

Outside the circular peripheral part 26A the confinement member 26 features, on the flange which it constitutes between this peripheral part and the central hub 44, on the one hand, regular deformations or vanes 47 and, on the other hand, holes 48 which are for preference set back from the circular peripheral part 26A.

The vanes 47 and holes 48 are complementary to one another so as to create, within the axial volume of the assembly as defined hereinafter, a turbine effect which further improves the cooling of the clutch cover assembly at this point.

The entire confinement member 26, that is to say both the circular peripheral part and the central flange part featuring the regular deformations or vanes 47 and the holes 48, is advantageously obtained by cutting and stamping a simple blank.

The hub 44 may have threaded over it the clutch release bearing B schematically represented in FIG. 1.

The clutch cover assembly 10 in accordance with the invention finally comprises, in a manner known per se, elastic means which, in order to bear axially on the pressure plate 20 and thus urge the latter in the direction towards the reaction plate 11 so as to clamp or engage the friction disk 12, bear on the cover 13.

In a manner known per se, in the embodiment shown these elastic means form part of a third generally annular member 38 called the diaphragm spring which, inserted axially between the pressure plate 20 and the cover 13, comprises on the one hand a circumferentially continuous peripheral part 39 forming a Belleville washer constituting said elastic means and, on the other hand, a central part subdivided by slots into radial fingers 40 by means of which it is adapted to be acted on by the clutch release bearing B in order to release or disengage the friction disk 12.

In practice the diaphragm spring 38 bears on the bottom 14 of the cover 13 through its circumferentially continous peripheral part 39, the cover 13 having for this purpose an annular bead 42 projecting in the axial direction towards the pressure plate 20.

The elastic means act axially on the pressure plate in a plane referred to for convenience as the action plane.

In the embodiment shown, it is through the intermediary of the confinement member 26 that, conjointly, through its circumferentially continuous peripheral part 39, the diaphragm spring 38 acts in the axial direction on the pressure plate 20.

It bears on the confinement member 26 in the axial direction, the latter member featuring for this purpose an annular bead 43 projecting axially in the vicinity of its outside perimeter, in the direction towards the bottom 14 of the cover 13, defining said action plane in which the elastic means act on the pressure plate.

As used in the present description, the expression "axial volume of the assembly" is to be understood as meaning a volume delimited in the axial direction by said action plane (defined in this instance by the annular bead 43) and by the outside surfce of the pressure plate 201.

It will be understood that a turbine effect is created in this axial volume, in this embodiment, by the vanes 47 on and the holes 48 in the confinement member 26.

It will be understood that various changes in the details, materials and arrangements of parts, which have been herein described and illustrated in order to explain the nature of the invention, may be made by those skilled in the art within the principle and scope of the invention as expressed in the appended claims.

This applies in particular to the number and configuration of the vanes 47 and the holes 48 employed.

Further, whereas in the embodiment shown the pressure plate 20 comprises air circulation grooves 25 which are closed off in the axial direction by the so-called confinement member 26, it need hardly be said that a member comprising vanes and holes in accordance with the invention could be fitted to a clutch cover assembly of which the pressure plate did not comprise any such air circulation grooves, cooling then being assured essentially by the turbine effect generated in the axial volume of the assembly by said member.

Figure 4:
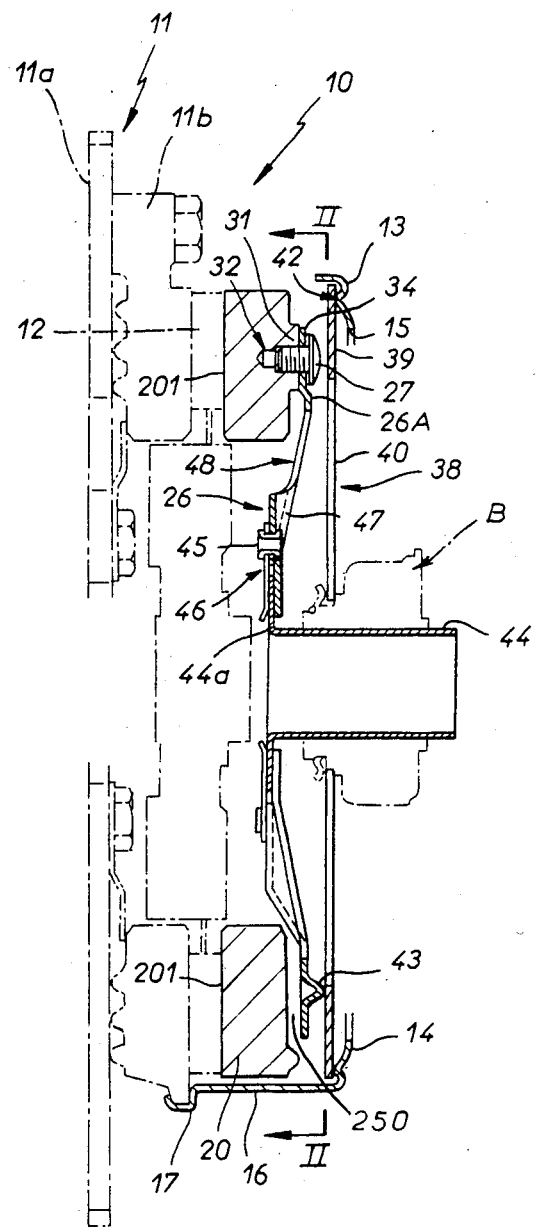
FIG. 4 is a view in axial cross-section corresponding to FIG. 2 and showing another embodiment of a clutch cover assembly in accordance with the invention.

Thus, in the embodiment shown in FIG. 4, the cooling fins 24 on the pressure plate 20 have been eliminated, the arrangement of the clutch cover assembly shown remaining in other ways similar to that of FIG. 1, with the same reference numerals being used for elements common to both figures.

It will be noted that the confinement member 26, now called the bearing member, is in bearing engagement on the one hand with the diaphragm spring through the annular bead 43 and on the other hand with the pressure plate, through the bosses 31 which the latter comprises.

It will also be noted, in the embodiment shown in FIG. 4, that the axial extent of the bosses 31 offers the advantage of providing an axial ventilation space 250 between the perimeter of the pressure plate and the bearing member 26.

Finally, it will be noted that the bearing member 26 may with advantage be made from the waste material produced on cutting out the central opening in the cover 13.

It will be understood that progressively acting elastic means may be disposed in a manner known per se between the elastic clutch release means and the pressure plate. In the latter case, depending on the type of progressive means employed, the axial volume of the assembly may vary in the axial direction during release of the clutch.

The present invention is equally applicable to "pull" and "push" type clutches.

We claim:

1. Pressure plate for a clutch cover assembly adapted on one side to act on a friction disk and comprising on its other side axially projecting cooling fins certain of which at least extend substantially from its inside perimeter to its outside perimeter and which delimit between them air circulation grooves, further comprising a confinement member attached to said pressure plate and adapted to close off said air circulation grooves on the side opposite side pressure plate and over at least part of their length and further adapted to generate a turbine effect, comprising for this purpose a flange formed with holes and carrying vanes.

2. Clutch cover assembly comprising a generally annular cover adapted to be attached to a reaction plate, a generally annular pressure plate having an outside surface adapted to act on a friction disk, constrained to rotate with said cover and movable relative to said cover in an axial direction, elastic means which bear on said cover and exert an axial force on said pressure plate for urging it away from said cover, and a bearing member adapted to generate a turbine effect within the axial volume of the assembly comprising a flange formed with holes and carrying vanes, said flange being fixed to said pressure plate and said elastic means bearing on said bearing member.

3. Clutch cover assembly according to claim 2, wherein said vanes constitute local deformations of said flange.

4. Clutch cover assembly according to claim 2, wherein said bearing member is cut and stamped from a sheetmetal blank.

5. Clutch cover assembly according to claim 2, wherein said bearing member defines means through which said elastic means exerts the force on said pressure plate.

6. Clutch cover assembly according to claim 2, wherein said pressure plate has a plurality of bosses extending in the axial direction toward said cover, said bearing member being fixed to said bosses, ventilating spaces being formed between said bearing member and facing portions of said pressure plate between adjacent bosses.

7. Clutch cover assembly according to claim 2, wherein a guide member for a clutch release bearing is fixed to said bearing member.

8. Clurch cover assembly according to claim 7, wherein said guide member has a radial flange, means clamping said radial flange at the inner periphery of said bearing member.

9. Clurch cover assembly comprising a generally annular cover adapted to be attached to a reaction plate, a generally annular pressure plate having an outside surface adapted to act on a friction disk and on an inside surface axially projecting cooling fins certain of which at least extend substantially from its inside perimeter to its outside perimeter and which delimit between them air circulation grooves, said pressure plate being constrained to rotate with said cover and movable relative to said cover in an axial direction, elastic means which bear on said cover and exert an axial force on said pressure plate, and a confinement member attached to said pressure plate and adapted to close off said air circulation grooves on the side oppsoite said pressure plate and over at least part of their length and further adapted to generate a turbine effect, comprising for this purpose a flange formed with holes and carrying vanes.

10. Clutch cover assembly according to claim 9, wherein said vanes constitute local deformations of said flange.

11. Clutch cover assembly according to claim 9, wherein said confinement member comprises a central hub, a circular peripheral part adapted to cooperate with said fins and an intermediate part between said circular peripheral part and said central hub on which said holes and said vanes are disposed.

12. Clucth cover assembly according to claim 11, wherein said confinement member is cut and stamped from a sheetmetal blank.

13. Clutch cover assembly according to claim 11, wherein said intermediate part is attached to said central hub by rivets and an annular disk member, said central hub comprising a flange adapted to be clamped between said intermediate part and said annular disk member.

14. Clutch cover assembly according to claim 13, wherein said central hub defines a guide for a clutch release bearing.

* * * * *